US012592929B2

(12) United States Patent
Punal et al.

(10) Patent No.: US 12,592,929 B2
(45) Date of Patent: Mar. 31, 2026

(54) TECHNIQUE FOR COMPUTING A BLOCK IN A BLOCKCHAIN NETWORK

(71) Applicant: Telefonaktiebolaget LM Ericsson (publ), Stockholm (SE)

(72) Inventors: Oscar Punal, Herzogenrath (DE); Mohammad Hossein Jafari, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 668 days.

(21) Appl. No.: 17/416,662

(22) PCT Filed: Dec. 21, 2018

(86) PCT No.: PCT/EP2018/086502
§ 371 (c)(1),
(2) Date: Jun. 21, 2021

(87) PCT Pub. No.: WO2020/126025
PCT Pub. Date: Jun. 25, 2020

(65) Prior Publication Data
US 2022/0038280 A1 Feb. 3, 2022

(51) Int. Cl.
*H04L 9/40* (2022.01)
*H04L 9/00* (2022.01)

(52) U.S. Cl.
CPC .............. *H04L 63/104* (2013.01); *H04L 9/50* (2022.05)

(58) Field of Classification Search
CPC ................................. H04L 63/104; H04L 9/50
See application file for complete search history.

(56) References Cited

U.S. PATENT DOCUMENTS

| | | | |
|---|---|---|---|
| 11,271,945 B2 * | 3/2022 | Coonrod | H04W 12/63 |
| 2019/0188086 A1 * | 6/2019 | Maeda | H04L 9/0637 |
| 2020/0007315 A1 * | 1/2020 | Vouk | H04L 9/0637 |

(Continued)

OTHER PUBLICATIONS

International Search Report and the Written Opinion of the International Searching Authority, issued in corresponding International Application No. PCT/EP2018/086502, dated Sep. 12, 2019, 10 pages.

(Continued)

*Primary Examiner* — Zachary A. Davis
(74) *Attorney, Agent, or Firm* — Rothwell, Figg, Ernst & Manbeck, P.C.

(57) ABSTRACT

A technique for controlling participation of a miner in a computation of a block for a message to be added to a blockchain in a blockchain network is disclosed, wherein the miner is assigned to a cluster comprising a set of miners of the blockchain network, and wherein the message is sent from an originating node to a destination node in the blockchain network. A method implementation of the technique is performed by the miner and comprises receiving (S306) the message, checking (S308) whether at least one of the originating node and the destination node of the message is assigned to the cluster to determine whether the miner is to participate in the computation of the block for the message, and starting (S310) to compute the block for the message if it is determined that the miner is to participate in the computation of the block for the message.

19 Claims, 8 Drawing Sheets

(56)           References Cited

U.S. PATENT DOCUMENTS

2022/0006641 A1 *   1/2022   Snow .................. H04L 9/0869

OTHER PUBLICATIONS

Yoo et al. "The Blockchain for Domain Based Static Sharding", 2018 17th IEEE International Conference on Trust, Security and Privacy in Computing and Communications/ 12th IEEE International Conference on Big Data Science and Engineering (Trustcom/ Bigdatase), IEEE,Aug. 1, 2018 (Aug. 1, 2018), pp. 1689-1692, XP033398927.

Durov, "Telegram Open Network", Dec. 3, 2017 (Dec. 3, 2017), Retrieved from the Internet: URL:https://www.kriptovaluta.hr/wp-content/uploads/2018/03/TON-Technology.pdf, XP055618185, [retrieved on Sep. 4, 2019], 132 pages.

Dorri et al. "LSB: A Lightweight Scalable BlockChain for IoT Security and Privacy", arxiv.org, Cornell University Library, 201 Olin Library Cornell University Ithaca, NY 14853,Dec. 8, 2017 (Dec. 8, 2017), p. 1-17, XP080845815.

Nakamoto "Bitcoin: A Peer-to-Peer Electronic Cash System" www. bitcoin.org, 2018, pp. 1-9.

* cited by examiner

Miner

Processor ~ 202

Memory ~ 204

Managing node

Processor ~ 212

Memory ~ 214

TECHNIQUE FOR COMPUTING A BLOCK IN A BLOCKCHAIN NETWORK

CROSS REFERENCE TO RELATED APPLICATION(S)

This application is a 35 U.S.C. § 371 National Phase Entry Application from PCT/EP2018/086502, filed Dec. 21, 2018, designating the United States, the disclosure of which is incorporated herein by reference in its entirety.

TECHNICAL FIELD

The present disclosure generally relates to blockchain networks. In particular, a technique for controlling participation of a miner in a computation of a block for a message to be added to a blockchain in a blockchain network is presented. The technique may be embodied in methods, computer programs, apparatuses and systems.

BACKGROUND

Blockchains have originally been proposed for use as public transaction ledger of the cryptocurrency "bitcoin" and have in the recent years emerged as general-purpose systems that allow for a decentralized, transparent and secure validation of messages. Messages exchanged in blockchain networks can principally include any type of information, ranging from cryptocurrencies to legal documents, for example.

Traditionally, a centralized trusted party has been used to validate messages, e.g., a bank institution for validating financial transactions. While these traditional architectures may work well for many systems, they generally have the drawback that the centralized trusted party may become a single target of attack. Blockchain technology, on the other hand, alms at removing the need for centralized trusted parties, reducing the time for validating messages and increasing transparency. In particular, blockchain-based systems aim at allowing any two nodes in a network to exchange messages in a decentralized and trusted manner.

Blockchain networks are based on the concept of maintaining a blockchain as a distributed ledger which keeps track of messages exchanged in the network. A blockchain corresponds to a continuously extendable list of records, so called blocks, which are linked using cryptographic techniques. Typically, each block contains a cryptographic hash of the previous block in the chain, a timestamp and data. For use as a distributed ledger, a blockchain is managed by a peer-to-peer network, i.e., the blockchain network, in which all nodes collectively adhere to a protocol for validating new blocks. By design, a blockchain is inherently resistant to modification of the data because, once recorded, the data in any given block cannot be altered retroactively without alteration of all subsequent blocks, which would require consensus among the majority of nodes in the network.

FIG. 1 exemplarily illustrates a portion of a single blockchain and the generic content of the blocks. As can be seen, each block contains the hash value of the previous block and, therefore, a chain dependency is established which protects against illegitimate modification of a message in a block, by requiring recalculation of any block generated after the modified block. Messages exchanged between the nodes of the network are stored in the blocks of the blockchain, wherein each message may comprise user data and a digital signature, e.g., the encrypted hash value of the user data. A message may be defined as Msg=D+H(D), where Msg denotes the message, D stands for the data included in the message and H( ) corresponds to a hash function.

New blocks are created by a consensus procedure among the nodes of the network and, once created, new blocks are appended to the chain. A typical consensus procedure is the so called "proof-of-work" method which corresponds to the procedure of searching for a hash value with a specific requirement, i.e., searching for a specific hash value that is obtained after applying a hash function on the whole content of a block. The difficulty of computing this hash value is determined by the number of zero bits that must exist at the beginning of the hash value. This number of zero bits is also known as the "degree of difficulty". By imposing a higher/lower number of zeros at the beginning of the hash value, the computational complexity can be in-creased/reduced. For computing the hash value, a so called "nonce", i.e., a random value that forms part of a block, may be employed. The nonce is modified randomly in the proof-of-work procedure to find the desired target hash value for the whole block. Different hash values may thus be obtained by modifying the nonce and/or adding new incoming messages. Finding the solution in the proof-of-work procedure is generally associated with high computational effort. It is to be noted that the proof-of-work method is not the only available consensus procedure and that other consensus methods are generally known, including proof-of-stake, proof-of-capacity, proof-of-burn and proof-of-activity, for example.

In a blockchain network, nodes which are responsible for computing blocks, e.g., which participate in performing the proof-of-work, are called "miners". To compute a new block, miners may collect all recent messages which are not yet included in the chain and combine the hash values obtained from the messages with the hash value of the previous block, the timestamp and the nonce (as depicted in FIG. 1). Next, a hash function is applied on this combined data, which results in a hash value of the new block. Miners perform this computation repeatedly (by modifying the nonce and/or adding new incoming messages) until a solution to the proof-of-work is found. The first miner that finds a solution broadcasts the computed block to the other nodes in the network and, if the other nodes validate the block, the block is added to the chain.

When a new message is thus to be added to the blockchain, the following steps are typically executed in the blockchain network: (1) the new message is broadcast from the originating node into the network and received by all nodes, (2) the message is validated by all nodes and every node broadcasts the result of the validation, i.e., Indicating whether the message is considered valid or not, (3) if the message is accepted, i.e., the majority of the nodes determine the message as valid, the miners start the computation of the block (e.g., the proof-of-work computation) for the message, (4) the first miner that finds a solution (e.g., to the proof-of-work) broadcasts the computed block into the network, (5) the other nodes validate the solution and broadcast the validation result into the network, i.e., Indicating whether the solution is accepted or rejected, and (6) if the solution is accepted, i.e., the majority of the nodes accept the solution, the block is added to the chain and the nodes update their ledger accordingly.

The validation of messages in step (2) above may be performed using known digital signatures, e.g., each message may be digitally signed by the originating node of the message by applying a hash function on the data of the message and encrypting the 2s obtained hash value with the private key of the originating node. The receiving nodes may then validate the message by decrypting the digital signature using the public key of the originating node, by computing the hash value of the data, and by com-paring the received hash value with the computed hash value.

Because of the need for such processing, blockchain-based applications (or in general proof-based distributed applications) are generally known to consume large amounts of energy. For every message to be added to a block, all miners of the blockchain network attempt to validate the message and, for every block of validated messages, miners start computing a solution for a consensus (e.g., proof-of-work) problem with the high computational resources and energy consumption mentioned above. If this technology continues to be applied for more and more applications and use cases, the rising energy consumption may likely trigger governmental institutions to define a set of rules to limit the energy consumption of blockchain-based systems.

For applications like massive Internet of Things (IoT) systems, where most devices are battery-driven, low energy consumption may even be mandatory. Limits in the total power consumption should thus generally to be taken into account.

SUMMARY

Accordingly, there is a need for a technique for computing blocks in a blockchain network that avoids one or more of the problems discussed above, or other problems.

According to a first aspect, a method for controlling participation of a miner in a computation of a block for a message to be added to a blockchain in a blockchain network is provided, wherein the miner is assigned to a cluster comprising a set of miners of the blockchain network, and wherein the message is sent from an originating node to a destination node in the blockchain network. The method is performed by the miner and comprises receiving the mes-sage, checking whether at least one of the originating node and the destination node of the message is assigned to the cluster to determine whether the miner is to participate in the computation of the block for the message, and starting to compute the block for the message if it is determined that the miner is to participate in the computation of the block for the message.

The method may further comprise not starting to compute the block for the message if it is determined that the miner is not to participate in the computation of the block for the message. The set of miners of the cluster may maintain a cluster-specific blockchain storing messages sent between nodes assigned to the cluster. When both the originating node and the destination node of the message are assigned to the cluster, the block computed for the message may be added to the cluster-specific blockchain. The blockchain network may comprise a plurality of clusters each compris-ing a set of miners of the blockchain network, wherein the sets of miners of the plurality of clusters may maintain a global blockchain storing messages sent between nodes assigned to different clusters among the plurality of clusters. When one of the originating node and the destination node of the message is assigned to the cluster and the other one of the originating node and the destination node of the message is assigned to another cluster among the plurality of clusters, the block computed for the message may be added to the global blockchain. When both the originating node and the destination node of the message are assigned to the cluster, the method further may comprise broadcasting a validation result of the message within the cluster. The method may further comprise receiving, prior to receiving the message, an assignment from a managing node of the blockchain network assigning the miner to the cluster. The method may further comprise receiving, prior to receiving the message, a plurality of node-to-cluster assignments from a managing node of the blockchain network indicating assignments of nodes of the blockchain network to the cluster, the assignments enabling the miner to check whether at least one of the originating node and the destination node of the message is assigned to the cluster.

According to a second aspect, a method for controlling participation of a miner in a computation of a block for a message to be added to a blockchain in a blockchain network is provided. The method is performed by a managing node of the blockchain network and comprises sending an assign-ment to the miner assigning the miner to a cluster compris-ing a set of miners of the blockchain network, the assign-ment configuring the miner to check whether at least one of an originating node and a destination node of a message received by the miner is assigned to the cluster to determine whether the miner is to participate in the computation of the block for the message.

The method according to the second aspect defines a method from a managing node's perspective which may be complementary to the method according to the first aspect. As such, those aspects described with regard to the method of the first aspect which are applicable to the method of the second aspect may be comprised by the method of the second aspect as well, and vice versa. In accordance with the method of the first aspect, the method may further comprise sending a plurality of node-to-cluster assignments to the miner indicating assignments of nodes of the blockchain network to the cluster, the assignments enabling the miner to check whether at least one of the originating node and the destination node of the received message is assigned to the cluster. The plurality of node-to-cluster assignments may be derived from messages exchanged between nodes of the blockchain network. The plurality of node-to-cluster assign-ments may be derived from previous messages stored in blocks of at least one blockchain of the blockchain network. The plurality of node-to-cluster assignments may be deter-mined based on interaction probabilities among the nodes of the blockchain network. The blockchain network may com-prise a plurality of clusters each comprising a set of miners of the blockchain network, wherein the plurality of node-to-cluster assignments may be determined based on the interaction probabilities so that an expected number of messages sent between nodes assigned to different clusters among the plurality of clusters is reduced. Alter-natively, the plurality of node-to-cluster assignments may derived from information included in messages exchanged between nodes of the blockchain network that are not yet stored in a blockchain of the blockchain network. When the blockchain network comprises a plurality of clusters each comprising a set of miners of the blockchain network, the assignment sent to the miner may be one of a plurality of miner-to-cluster assignments determined by the managing node and indicat-ing assignments of miners of the blockchain network to the plurality of clusters. The miner-to-cluster assignments may be determined so that computational complexity for com-puting blocks by the miners of the blockchain network is adjusted to a desired distribution among the plurality of clusters. The assignment sent to the miner may include a configuration for the miner to adjust a degree of difficulty to be applied in computing $1o$ the block for the message by the miner. At least one of sending the assignment to the miner and sending the node-to-cluster assignments to the miner may be performed repeatedly with different assignments to dynamically adapt the assignments to varying conditions in the blockchain network.

According to a third aspect, a computer program product is provided. The computer program product comprises program code portions for performing the method of at least one of the first and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a miner for participating in a computation of a block for a message to be added to a blockchain in a blockchain network is provided, wherein the miner is assigned to a cluster comprising a set of miners of the blockchain network, and wherein the message is sent from an originating node to a destination node in the blockchain network. The miner is configured to perform any of the method steps presented herein with respect to the first aspect. The miner may comprise at least one processor and at least one memory, wherein the at least one memory contains instructions executable by the at least one processor such that the miner is operable to perform any of the method steps presented herein with respect to the first aspect.

According to a fifth aspect, a managing node for controlling participation of a miner in a computation of a block for a message to be added to a blockchain in a blockchain network is provided. The managing node is configured to perform any of the method steps presented herein with respect to the second aspect. The managing node may comprise at least one processor and at least one memory, wherein the at least one memory contains instructions executable by the at least one processor such that the managing node is operable to perform any of the method steps presented herein with respect to the second aspect.

According to an sixth aspect, there is provided a system comprising at least one miner of the fourth aspect and a managing node of the fifth aspect.

BRIEF DESCRIPTION OF THE DRAWINGS

Implementations of the technique presented herein are described herein with reference to the accompanying drawings, in which:

FIGS. 2a to 2b illustrate exemplary compositions of a miner and a managing node of the blockchain network according to the present disclosure;

DETAILED DESCRIPTION

Figure 1:
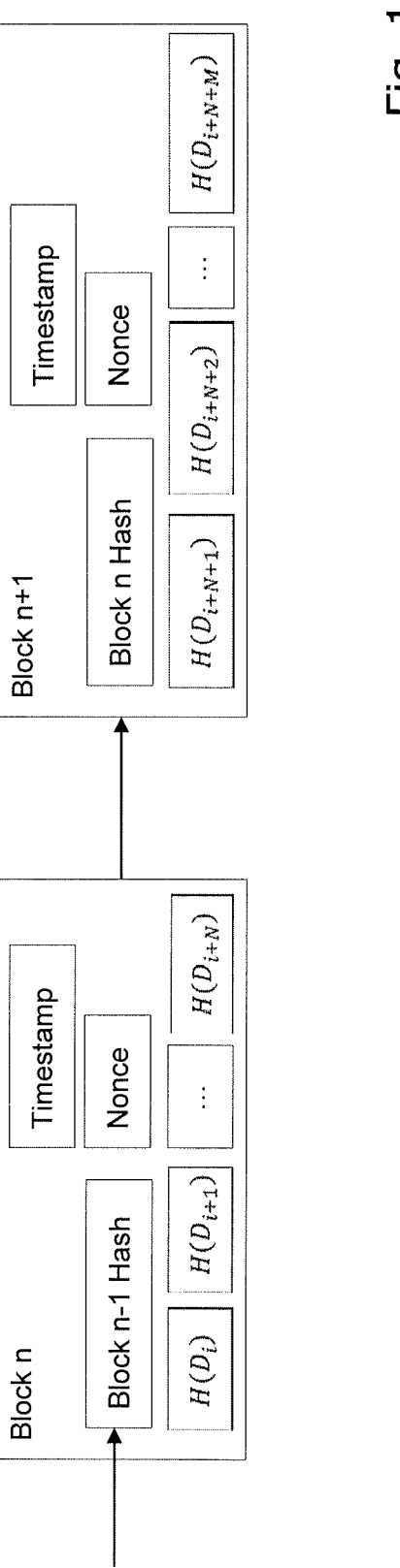
FIG. 1 illustrates an exemplary portion of a blockchain and the contents of blocks.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figures 2A, 2B:
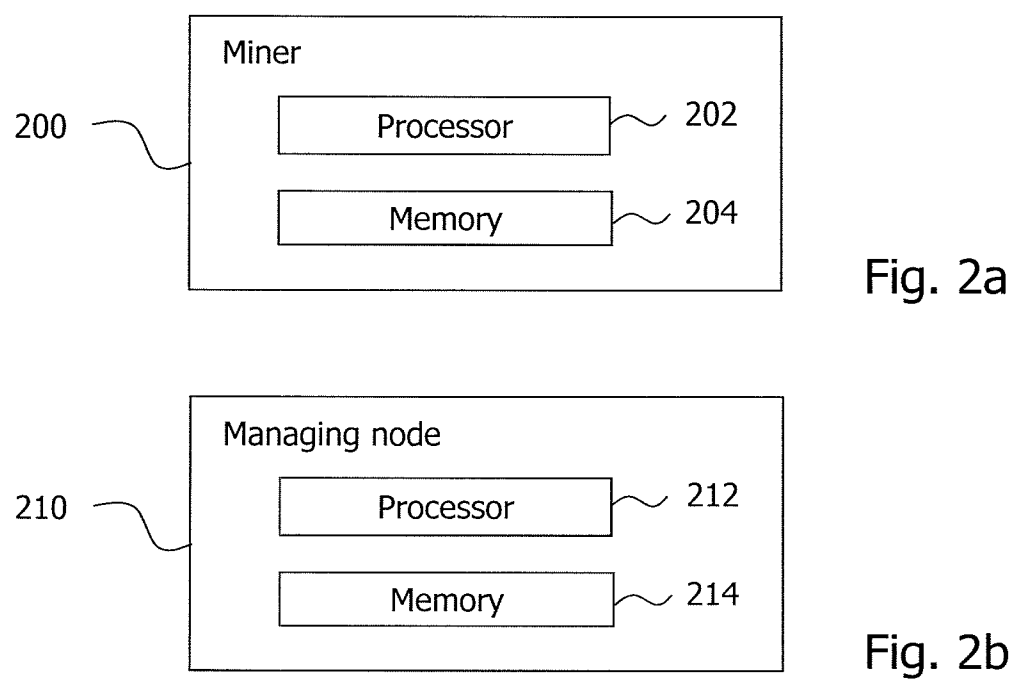

FIG. 2a schematically illustrates an exemplary composition of a miner 200 for participating in a computation of a block for a message to be added to a blockchain in a blockchain network. The miner 200 comprises at least one processor 202 and at least one memory 204, wherein the at least one memory 204 contains instructions executable by the at least one processor 202 such that the miner 200 is operable to carry out the method steps described herein below with reference to the "miner".

FIG. 2b schematically illustrates an exemplary composition of a managing node 210 for controlling participation of a miner in a computation of a block for a message to be added to a blockchain in a blockchain network. The managing node 210 comprises at least one processor 212 and at least one memory 214, wherein the at least one memory 214 contains instructions executable by the at least one processor 212 such that the managing node 210 is operable to carry out the method steps described herein below with reference to the "managing node".

It will be understood that each of the miner 200 and the managing node 210 may be implemented on a physical computing unit or a virtualized computing unit, such as a virtual machine, for example. It will further be appreciated that each of the miner 200 and the managing node 210 may not necessarily be implemented on a standalone computing unit, but may be implemented as components—realized in software and/or hardware—residing on multiple distributed computing units as well, such as in a cloud computing environment, for example.

Figure 3:
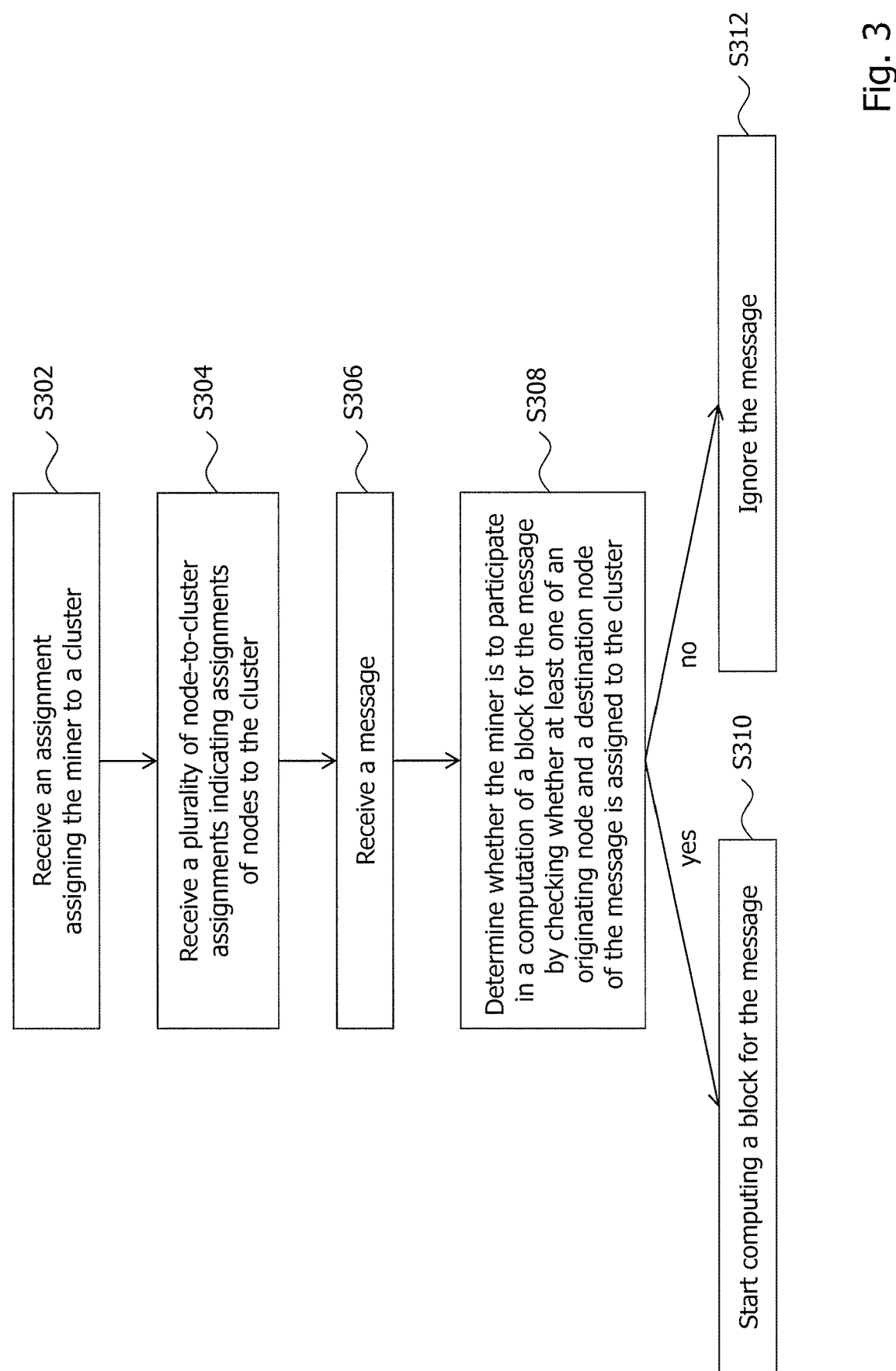
FIG. 3 illustrates a method which may be performed by the miner according to the present disclosure.

FIG. 3 illustrates a method which may be performed by the miner 200 according to the present disclosure. The method is dedicated to controlling participation of the miner 200 in a computation of a block for a message to be added to a blockchain in a blockchain network, wherein the miner 200 is assigned to a cluster comprising a set of miners of the blockchain network, and wherein the message is sent from an originating node to a destination node in the blockchain network.

In step S302, the miner 200 may receive an assignment from a managing node (e.g., the managing node 210) of the blockchain network assigning the miner to the cluster. In step S304, the miner 200 may receive a plurality of node-to-cluster assignments from the managing node of the blockchain network indicating assignments of nodes of the blockchain network to the cluster, the assignments enabling the miner to check whether at least one of the originating node and the destination node of the message is assigned to the cluster. In step S306, the miner 200 may receive the message. In step S308, the miner 200 may check whether at least one of the originating node and the destination node of the message is assigned to the cluster to determine whether the miner is to participate in the computation of the block for the message. In step S310, the miner 200 may start to compute the block for the message, if it is determined that the miner 200 is to participate in the computation of the block for the message and, in step S312, the miner 200 may not start to compute the block for the message, if it is determined that the miner 200 is not to participate in the computation of the block for the message.

The miner 200 may listen to messages exchanged between nodes of the blockchain network and receive the message in step S306 for validation and block computation purposes, the message actually being sent (e.g., broadcast) from the originating node to the destination node in the blockchain network. The blockchain network may comprise a plurality of nodes, wherein a subset of the nodes may act as miners that participate in computing the block for the message and wherein another subset of the plurality of nodes may correspond to user nodes that exchange messages.

According to the technique presented herein, rather than in traditional blockchain networks, participation of miners in the block computation for messages exchanged in the blockchain network may be controlled based on cluster memberships. The miner 200 may thus be assigned to a cluster comprising a set of miners of the blockchain network. The set of miners included in the cluster may be a (e.g., true) subset of all miners in the blockchain network so that the number of miners included in the cluster is less than the number of miners available in the blockchain network.

To determine whether the miner 200 is to participate in the computation of the block for the message, the miner 200 may check, in accordance with step S308, whether at least one of the originating node and the destination node of the message is assigned to the cluster. In other words, the miner 200 may decide on participating in the computation of the block for the message based on checking the cluster membership of the originating node and the destination node and, if at least one of these nodes belongs to the same cluster as the miner 200, the miner 200 may start to compute the block for the message in step S310. If, on the other hand, it is determined that none of the originating node and the destination node belongs to the same cluster, the miner 200 may not start to compute the block for the message (in accordance with step S312), e.g., the miner may simply ignore the message for block computation. As compared to traditional blockchain networks, in which all miners participate in the computation of the block for the message, the number of miners involved in the block computation may thereby be reduced and energy savings be achieved accordingly.

The cluster may be one of a plurality of clusters defined in the blockchain network, wherein each of the plurality of clusters may comprise a set of miners (e.g., a true subset of miners) of the blockchain network. With respect to the cluster membership of the originating node and the destination node of the message, it Is thus conceivable that, in one variant, both the originating node and the destination node are assigned to the same cluster as the miner or, in another variant, that only one of the originating node and the destination node of the message is assigned to the same cluster as the miner and the other one of the originating node and the destination node of the message is assigned to another cluster among the plurality of clusters. Depending on the variant, the block computed for the message may be added to a different blockchain.

On the one hand, for messages that are exchanged between nodes within the same cluster (also called "Intra-cluster" messages), cluster-specific blockchains may be maintained by the miners of the respective cluster. For each cluster among the plurality of clusters, a cluster-specific blockchain (corresponding to a ledger specific to the respective cluster) may be used to store the intra-cluster messages exchanged within the respective cluster. The set of miners of the cluster (i.e., the cluster of the miner 200) may thus maintain a cluster-specific blockchain storing messages sent between nodes assigned to the cluster. When both the originating node and the destination node of the message are thus assigned to the cluster, the block computed for the message may be added to the cluster-specific blockchain.

On the other hand, for messages that are exchanged between nodes belonging to different clusters (also called "inter-cluster" messages), a global blockchain may be maintained. A global blockchain (corresponding to an overall ledger for different clusters) may be used to store inter-cluster messages exchanged between nodes assigned to different clusters. In one variant, a global blockchain may be maintained for all clusters among the plurality of clusters and, in another variant, separate global blockchains may be maintained for pairs of different clusters among the plurality of clusters, for example. The blockchain network may thus comprise a plurality of clusters each comprising a set of miners of the blockchain network, wherein the sets of miners of the plurality of clusters maintain a global blockchain storing messages sent between nodes assigned to different clusters among the plurality of clusters. When one of the originating node and the destination node of the message is assigned to the cluster (i.e., the cluster of the miner 200) and the other one of the originating node and the destination node of the message is assigned to another cluster among the plurality of clusters, the block computed for the message may be added to the global blockchain.

Depending on whether the message is an intra-cluster message or an inter-cluster message, the miner 200 may therefore determine whether the message is to be stored in a cluster-specific blockchain or a global blockchain, provided that the miner 200 is responsible for computing the block for the message, as described above. As a result, for intra-cluster messages, only miners which are assigned to the respective cluster may participate in the computation of the block for the message and, for inter-cluster messages, miners of different clusters may participate in the computation of the block for the message. The total number of miners involved in the block computation may thus generally be reduced as compared to traditional blockchain networks and energy savings may thus be achieved.

When the miner 200 starts to compute the block for the message, the miner 200 may be one of a set of miners (e.g., either a set of miners of the same cluster or a set of miners of different clusters, as described above) that start to compute the block as part of a consensus procedure employed in the blockchain network, and thereby "participate" In the computation of the block. Each participating miner may start to compute the block separately (e.g., in parallel), wherein the first miner that successfully completes computing the block may notify the other miners of the set of miners to reach consensus about the computed block. The consensus procedure may be a proof-based procedure, such as one of the proof-of-work, proof-of-stake, proof-of-capacity, proof-of-burn, or proof-of-activity procedures mentioned above. In case of the proof-of-work procedure, for example, each of the set of miners may start computing a proof-of-work for the block, wherein the first miner which finds a solution to the proof-of-work may broadcast the solution to the other miners of the set of miners for validation. If the other miners accept the solution, the block may be added to the respective blockchain (e.g., either to a cluster-specific blockchain or to a global blockchain, as described above). The general procedure of computing the block for the message may correspond to the block creation procedure for new messages to be added to a blockchain described above for traditional blockchain networks. Unnecessary repetitions are thus omitted at this point.

In terms of the communication among the miners required for carrying out the consensus procedure, the miners of the set of miners may not necessarily send (e.g., broadcast) their validation results to all miners in the blockchain network but instead send (e.g. multicast) these results only to those miners that participate in the consensus procedure (e.g., either all miners of the same cluster in case of a cluster-specific blockchain or a set of miners from different clusters in case of a global blockchain). When both the originating node and the destination node of the message are assigned to the cluster (i.e., the cluster of the miner 200), the method may thus further comprise broadcasting a validation result of the message within the cluster (e.g., multicasting the validation result to all miners of this cluster only). The validation result may be computed as part of a consensus procedure, for example. It will be understood that miners may also broadcast their validation results to all miners in the blockchain network and each receiving miner may check whether the sending miner is assigned to the same cluster as the receiving miner and, if so, the receiving miner may consider the validation result. Otherwise, the receiving miner may discard the received validation result.

To be able to check whether at least one of the originating node and the destination node of the message is assigned to the same cluster as the miner 200, the miner 200 may need to know to which cluster it belongs. To this end, the miner 200 may obtain corresponding configuration information from a managing node of the blockchain network, for example. In accordance with step S302, the miner 200 may thus receive, prior to receiving the message in step S306, an assignment from a managing node of the blockchain network assigning the miner 200 to the cluster. Similarly, in order to know to which clusters the originating node and the destination node of the message belong, the miner 200 may receive, prior to receiving the message, a plurality of node-to-cluster assignments from the managing node of the blockchain network indicating assignments of nodes of the blockchain network to the cluster, wherein the assignments enable the miner 200 to check whether at least one of the originating node and the destination node of the message is assigned to the cluster.

It will be understood that the node-to-cluster assignments may not only include assignments of nodes to the cluster of the miner 200, but may also include assignments of nodes to other clusters among the plurality of clusters of the blockchain network. The managing node may be an operation Support System (OSS) node of the network, for example, but it will be understood that other nodes of the blockchain network may act as managing node as well.

Figure 4:
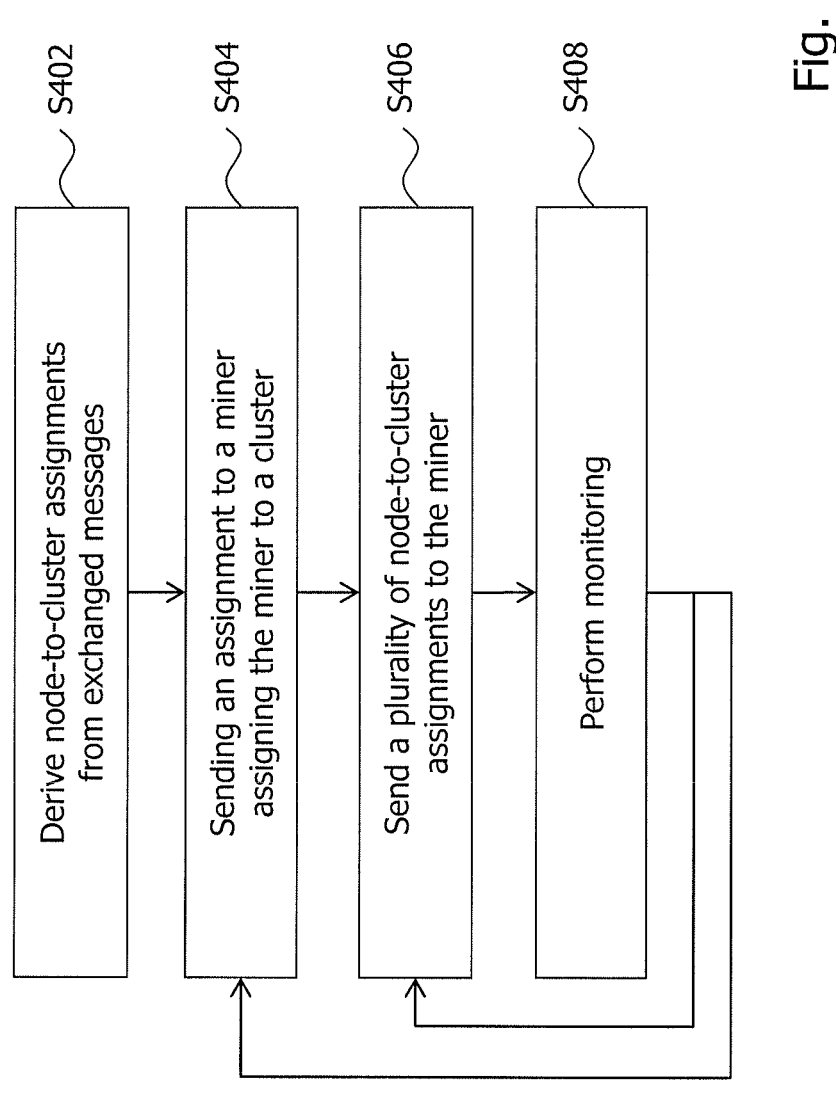
FIG. 4 illustrates a method which may be performed by the managing node according to the present disclosure.

FIG. 4 illustrates a method which may be performed by the managing node 210 according to the present disclosure. The method is dedicated to controlling participation of a miner (e.g., the miner 200) in a computation of a block for a message to be added to a blockchain in the blockchain network. The operation of the managing node 210 may be complementary to the operation of the miner 200 described above in relation to FIG. 3 and, as such, aspects described above with regard to the managing node may be applicable to the managing node 210 as well as its operation described in the following as well. Unnecessary repetitions are thus omitted in the following.

In step S402, the managing node 210 may derive a plurality of node-to-cluster assignments from messages exchanged between nodes of the blockchain network. In accordance with the description of FIG. 3, in step S404, the managing node 210 may send an assignment to the miner assigning the miner to a cluster comprising a set of miners of the blockchain network, the assignment configuring the miner to check whether at least one of an originating node and a destination node of a message received by the miner is assigned to the cluster to determine whether the miner is to participate in the computation of the block for the message. In step S406, the managing node 210 may send a plurality of node-to-cluster assignments to the miner indicating assignments of nodes of the blockchain network to the cluster, the assignments enabling the miner to check whether at least one of the originating node and the destination node of the received message is assigned to the cluster. In step S408, the managing node 210 may monitor parameters for determining the assignment of the miner to a cluster and the plurality of node-to-cluster assignments so that at least one of sending the assignment to the miner and sending the node-to-cluster assignments to the miner may be performed repeatedly with different assignments to dynamically adapt the assignments to varying conditions in the blockchain network.

Figure 5:
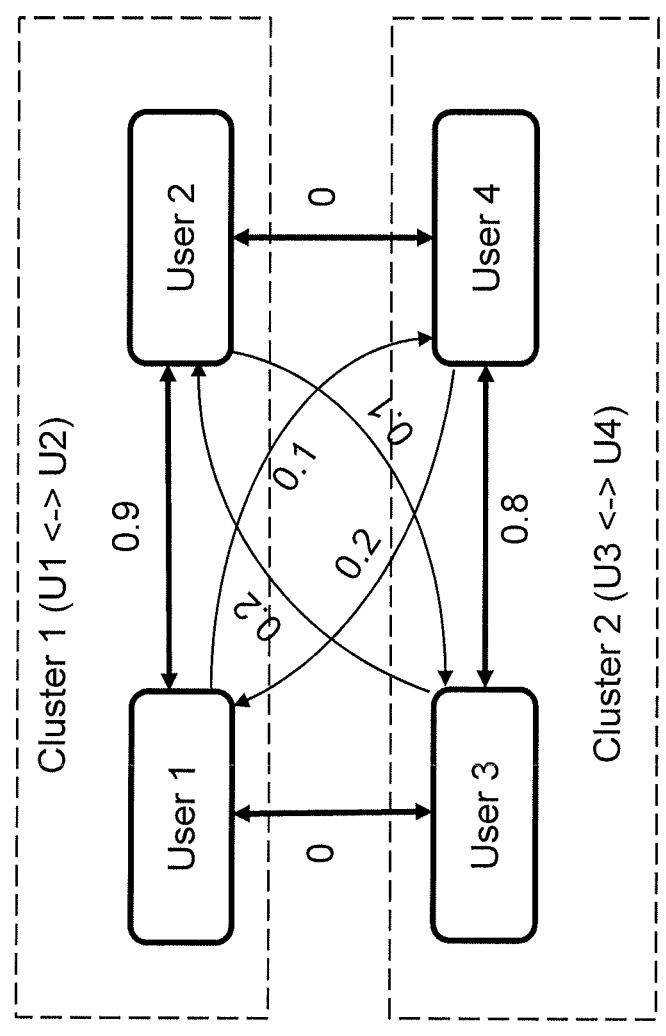
FIG. 5 illustrates an diagram indicating exemplary interaction probabilities among nodes of a blockchain network according to the present disclosure.

As said, in step S402, the plurality of node-to-cluster assignments may be derived from messages exchanged between nodes of the blockchain network. In one variant, the plurality of node-to-cluster assignments may be derived from previous messages stored in blocks of at least one blockchain of the blockchain network. In particular, the plurality of node-to-cluster assignments may be determined based on interaction probabilities among the nodes of the blockchain network. FIG. 5 illustrates a diagram indicating exemplary interaction probabilities among nodes of a blockchain network according to the present disclosure. In the shown example, the blockchain network comprises four user nodes, wherein the interaction probabilities derived from previous messages indicate that the interaction probability between user nodes 1 and 2 and between user nodes 3 and 4 are relatively high (90% and 80%), whereas the interaction probabilities between the remaining pairs of user nodes are relatively low (0%, 10% or 20%). User nodes 1 and 2 are therefore combined into a first cluster (cluster 1) and user nodes 3 and 4 are thus combined into a second cluster (cluster 2). The resulting node-to-cluster assignments may thus indicate that user nodes 1 and 2 are assigned to cluster 1 and user nodes 3 and 4 are assigned to cluster 2.

In another variant, the plurality of node-to-cluster assignments may be derived from information included in messages exchanged between nodes of the blockchain network, e.g., current messages that are not yet stored in a blockchain of the blockchain network. The information included in such message may comprise at least one of a node type of the originating node of the message, an application type of an application executed on the originating node of the message and a geographical location of the originating node of the message, for example. As an example, the originating node may be assigned to a cluster based on its geographical location. In this way, new nodes that just start sending messages in the blockchain network and whose messages are not yet stored in a blockchain of the blockchain network may (e.g., instantaneously) be assigned to clusters of the blockchain network.

To generally reduce the computational effort and energy consumption within the blockchain network, the node-to-cluster assignments may be determined in such a way that the probability for the occurrence of inter-cluster messages is relatively low. When the blockchain network comprises a plurality of clusters each comprising a set of miners of the blockchain network, the plurality of node-to-cluster assignments may thus be determined based on the interaction probabilities so that an expected number of messages sent between nodes assigned to different clusters among the plurality of clusters is reduced.

In accordance with step S404, the managing node 210 may assign the miner to a cluster. When the blockchain network comprises a plurality of clusters each comprising a set of miners of the blockchain network, the assignment sent to the miner may be one of a plurality of miner-to-cluster assignments determined by the managing node 210 and indicating assignments of miners of the blockchain network to the plurality of clusters. The managing node 210 may determine the miner-to-cluster assignments such that computational complexity (and thus security) for computing blocks by the miners of the blockchain network is adjusted to a desired distribution among the plurality of clusters. For example, the managing node 210 may determine the miner-to-cluster assignments in such a way that the computational complexity (and thus the security level) is kept homogeneously among the plurality of clusters. It will be understood, however, that—depending on network capabilities and conditions—the desired distribution may be selected differently, e.g., inhomogeneously among the plurality of clusters, if needed.

After clustering, the degree of difficulty may be reduced per cluster so that the same (or a similar) average time for computing blocks for messages may be maintained, despite the reduction of the number of miners per cluster. In order to configure a miner accordingly, the assignment sent to the miner from the managing node 210 may include a configuration for the miner to adjust (e.g., reduce) a degree of difficulty to be applied in computing the block for the message by the miner. In order to dynamically adapt the assignments to varying conditions in the blockchain network, the managing node 210 may further, in step S408, (e.g., continuously) monitor parameters for determining the assignment of the miner to a cluster and the plurality of node-to-cluster assignments (e.g., the managing node 210 may monitor the messages being exchanged in the blockchain network or being stored in blocks of at least one blockchain of the blockchain network, as described above) and, if one or more of the assignments changes during the monitoring, the managing node 210 may send the miner-to-cluster assignment and/or the node-to-cluster assignments to the miner anew. At least one of sending the assignment to the miner and sending the node-to-cluster assignments to the miner may thus be performed repeatedly with different assignments to dynamically adapt the assignments to varying conditions in the blockchain network.

Figure 6:
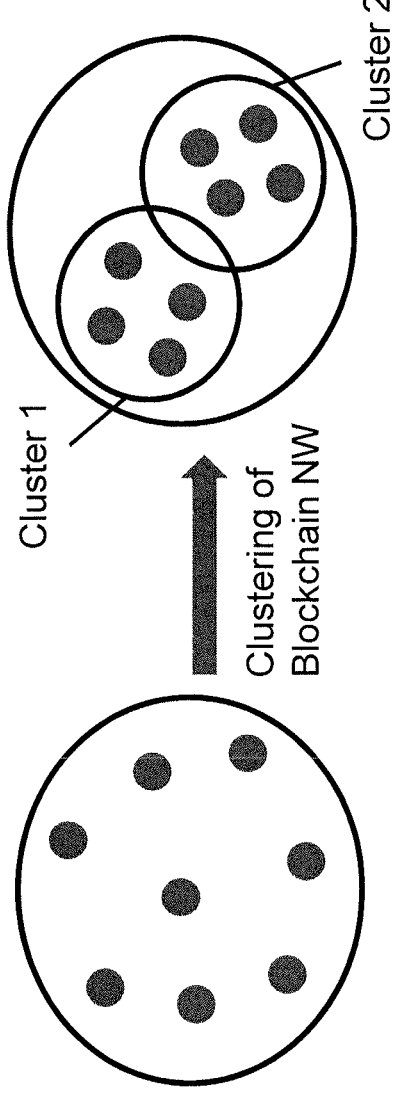
FIG. 6 illustrates an exemplary clustering of miners in a blockchain network according to the present disclosure.

FIG. 6 illustrates an exemplary clustering according to the present disclosure, where the miners are assigned to separate clusters. More specifically, on the left-hand side of the figure, a plurality of miners of a traditional blockchain network are shown and, on the right-hand side of the figure, it is shown how these miners may be assigned to different clusters in accordance with the technique presented herein. In the depicted example, the miners of the traditional blockchain network are clustered into two clusters, i.e., clusters 1 and 2. In accordance with the technique presented herein, for intra-cluster messages exchanged between nodes of cluster 1, only the miners included in cluster 1 may participate in the computation of blocks for the intra-cluster messages. Similarly, for intra-cluster messages exchanged between nodes of cluster 2, only the miners included in cluster 2 may participate in the computation of blocks for the intra-cluster messages. For each of clusters 1 and 2, a separate cluster-specific blockchain may be maintained and the corresponding intra-cluster messages may be stored in the blocks of these cluster-specific blockchains accordingly. For inter-cluster messages exchanged between nodes of cluster 1 and cluster 2, on the other hand, both the miners of clusters 1 and 2 may participate in the computation of blocks for the inter-cluster messages. For these messages, a global blockchain may be maintained and the corresponding inter-cluster messages may be stored in the blocks of the global blockchain. As compared to traditional blockchain networks, in which all miners participate in the computation of blocks for exchanged messages, a reduced computational effort and energy consumption can thus be achieved. More specifically, for the same number of messages to be stored in the blockchain network of FIG. 6, the following equation generally applies:

$$E_{cluster\ 1}+E_{cluster\ 2}+E_{inter\text{-}cluster}{\leq}E_{traditional}$$

wherein $E_{cluster\ 1}$ denotes the total energy consumed for the computation of blocks for intra-cluster messages exchanged within cluster 1, $E_{cluster\ 2}$ denotes the total energy consumed for the computation of blocks for intra-cluster messages exchanged within cluster 2, $E_{inter\text{-}cluster}$ denotes the total energy consumed for the computation of blocks for inter-cluster messages exchanged between cluster 1 and cluster 2, and $E_{traditional}$ denotes the total energy consumed for the computation of blocks for the same messages in a traditional blockchain network.

Figure 7:
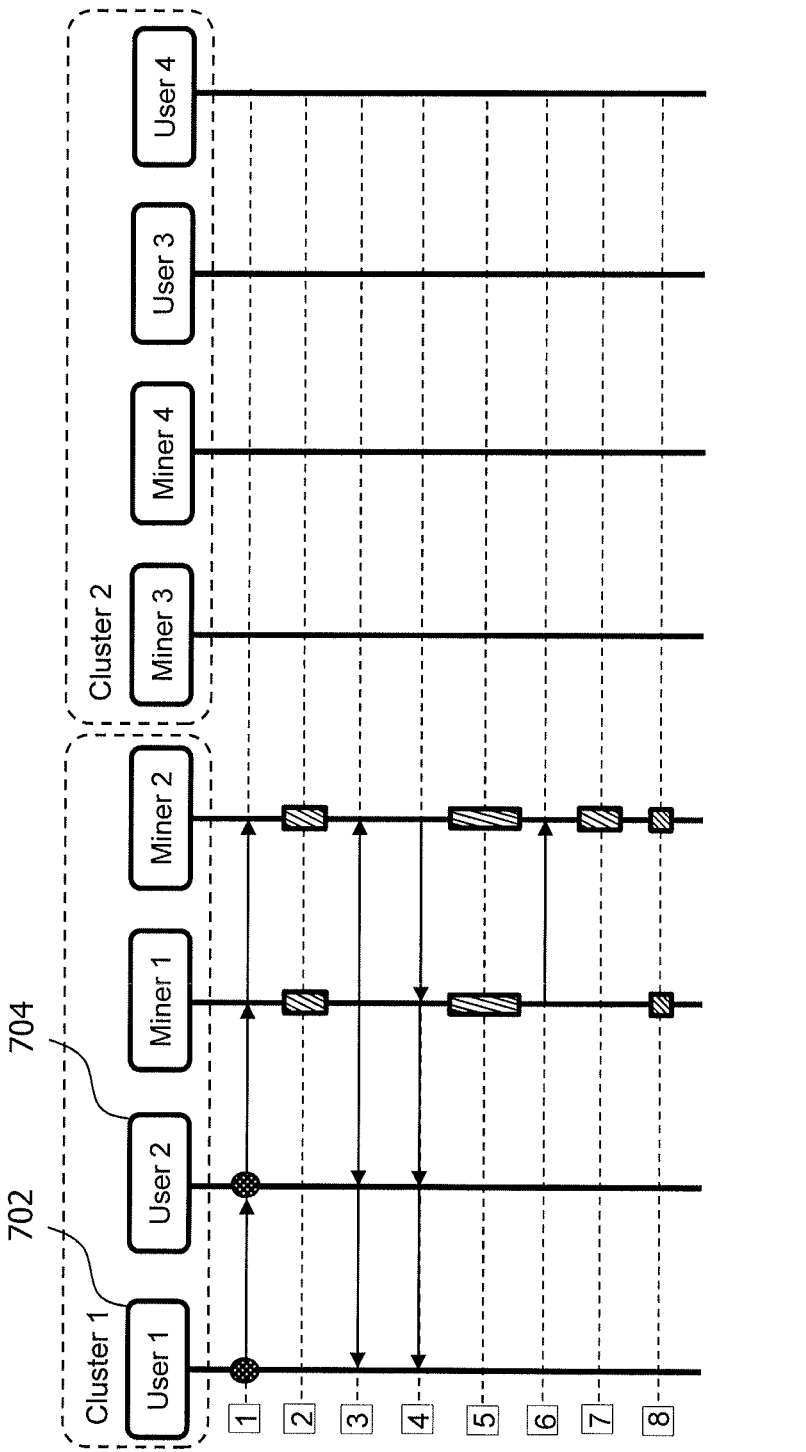
FIG. 7 illustrates an exemplary sequence of operations performed when an intra-cluster message is added to a cluster-specific blockchain of a blockchain network according to the present disclosure.

FIG. 7 illustrates an exemplary sequence of operations performed when an intra-cluster message is added to a cluster-specific blockchain of a blockchain network according to the present disclosure. In the shown example, user nodes 1 and 2 and miners 1 and 2 belong to cluster 1 and user nodes 3 and 4 and miners 3 and 4 belong to cluster 2. User node 1 sends (e.g., broadcasts) a message to user node 2 and, therefore, user node 1 corresponds to an originating node 702 of the message and user node 2 corresponds to a destination node 704 of the message.

In step 1 of the exemplary procedure, user node 1 broadcasts the message within the cluster 1 to user node 2 and, in step 2, miners 1 and 2 determine whether they are responsible to perform block computation for the message by checking whether at least one of user node 1 and user node 2 is assigned to cluster 1. As this is the case in the shown example, miners 1 and 2 determine that they are to participate in the computation of the block for the message and miners 1 and 2 validate the message accordingly. This validation may be performed as described above for traditional blockchain networks using digital signatures. In steps 3 and 4, miners 1 and 2 broadcast their validation results within cluster 1. Assuming that both validations are successful, miners 1 and 2 start to compute the block for the message in step 5, e.g., by starting to compute a corresponding proof-of-work. In the shown example, miner 1 is the first miner that finds a solution (i.e., a fully computed block) and broadcasts the solution within cluster 1 in step 6. In step 7, miner 2 validates the block computed by miner 1 and, assuming acceptance by miner 2, both miners 1 and 2 add the computed block to the cluster-specific blockchain for cluster 1 (corresponding to the ledger for cluster 1).

Figure 8:
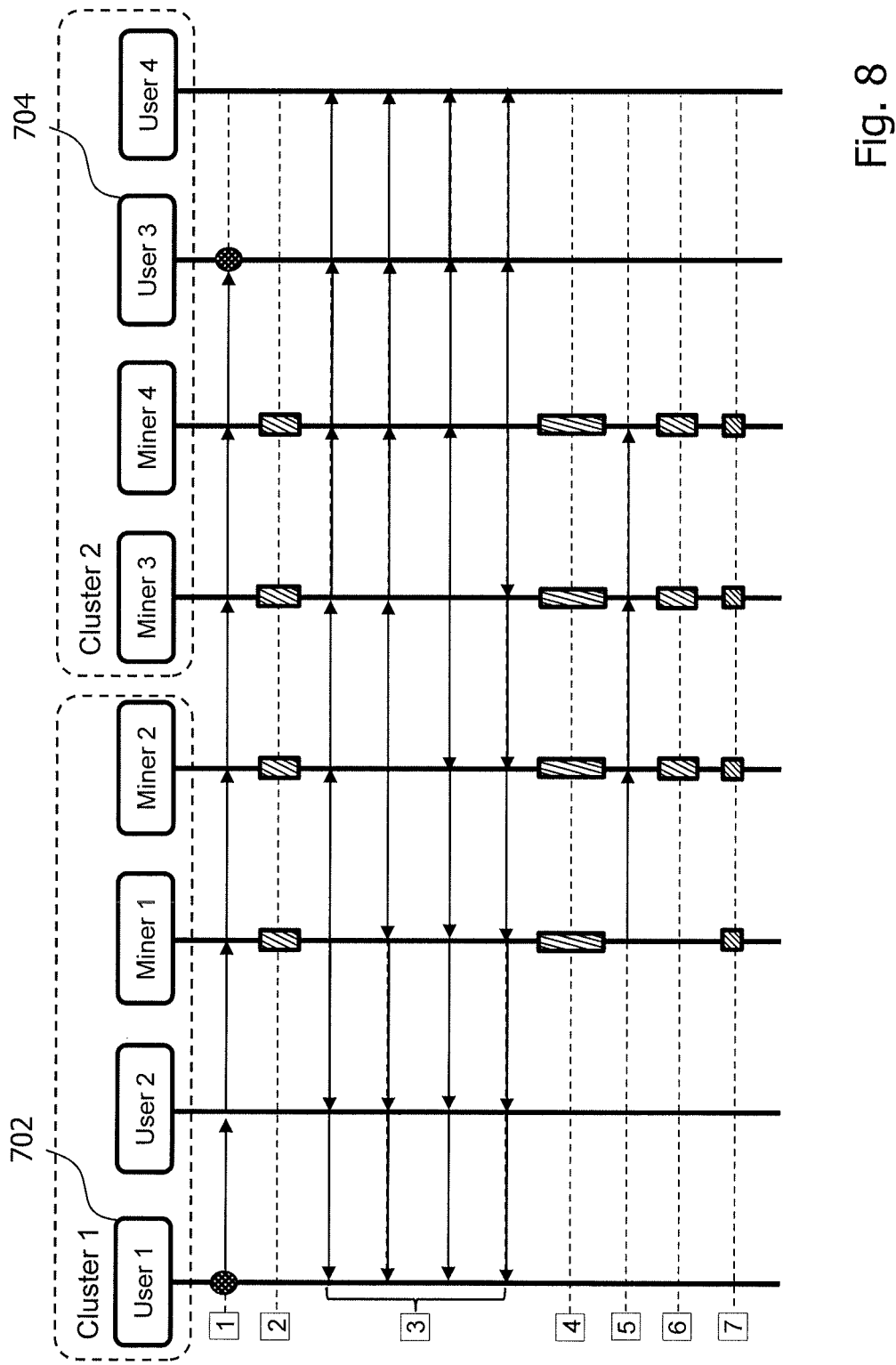
FIG. 8 illustrates an exemplary sequence of operations performed when an inter-cluster message is added to a global blockchain of a blockchain network according to the present disclosure.

FIG. 8 illustrates an exemplary sequence of operations performed when an inter-cluster message is added to a global blockchain of a blockchain network according to the present disclosure. The setup of this example essentially resembles the setup of FIG. 7, the only difference being that, instead of an intra-cluster message, an inter-cluster message is sent from user node 1 (assigned to cluster 1) to user node 3 (assigned to cluster 2) so that user node 3 corresponds to the destination node 704 in this case. As a consequence, all miners from clusters 1 and 2 will participate in the computation of the block for the message.

In step 1 of the exemplary procedure, user node 1 (in cluster 1) broadcasts the message to user node 3 (in cluster 2) and, in step 2, all miners 1, 2, 3 and 4 determine whether they are responsible to perform block computation for the message by checking whether at least one of user node 1 and user node 3 is assigned to the cluster of the respective miner. As this is the case for all miners, miners 1, 2, 3 and 4 determine that they are to participate in the computation of the block for the message and validate the message accordingly. This validation may again be performed as described above for traditional blockchain networks using digital signatures. In step 3, miners 1, 2, 3 and 4 broadcast their validation results into the blockchain network and, assuming that the validations are successful, all miners 1, 2, 3 and 4 start to compute the block for the message in step 4, e.g., by starting to compute a corresponding proof-of-work. In the shown example, miner 1 is again the first miner that finds a solution (i.e., a fully computed block) and broadcasts the solution into the blockchain network in step 5. In step 6, miners 2, 3 and 4 validate the block computed by miner 1 and, assuming acceptance by miners 2, 3 and 4, all miners 1, 2, 3 and 4 add the computed block to the global blockchain (corresponding to a global ledger) of the blockchain network.

In general, it may be said that, in traditional blockchain networks, the amount of computational power is roughly proportional to the security level, i.e., a higher/lower security level can be achieved by increasing/decreasing the number of computational power (here, the security level may correspond to the robustness of the data carried within the messages against modification by attackers). It follows that blockchain technology may generally achieve higher security levels at the cost of higher computational power. Since, in traditional blockchain networks, all nodes can act as miners, this effectively results in a significantly higher energy consumption compared to the central trust-based systems mentioned above.

As has become apparent from the above, on the other hand, the present disclosure provides a technique for controlling participation of a miner in a computation of a block for a message to be added to a blockchain in a blockchain network. According to the presented technique, by assigning miners and nodes to clusters, the number of active miners involved in the validation and computation of a block for a message may generally be reduced. Clusters may be created to reflect the most common interactions between pairs of nodes, e.g., to minimize the number of messages between nodes that have been assigned to different clusters. Clustering may generally aim at reducing the network-wide energy spent by diminishing the time and effort spent on computing blocks for messages, e.g., involving proof-of-work computations that demand high computational resources. As a result, the aggregate computational effort, the overall required network capacity and the total energy consumption may be decreased.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for controlling participation of a first miner in a computation of a block for a first message to be added to a blockchain in a blockchain network, the first miner being assigned to a first cluster comprising a set of miners, which includes the first miner, of the blockchain network, the first message being sent from an originating node to a destination node in the blockchain network, the method being performed by the first miner and comprising:

receiving, from a managing node of the blockchain network, information indicating an assignment of the first miner to the first cluster;

receiving, from the managing node of the blockchain network, information indicating a plurality of node-to-cluster assignments of a first plurality of nodes of the blockchain network to the first cluster;

receiving the first message sent from the originating node to the destination node;

after receiving the first message, based on i) the information indicating the assignment of the first miner to the first cluster and ii) the information indicating the plurality of node-to-cluster assignments of the first plurality of nodes of the blockchain network to the first cluster, checking whether at least one of the originating node and the destination node of the first message is assigned to the first cluster; and based at least on determining that at least one of the originating node of the first message and the destination node of the first message is assigned to the first cluster, computing the block for the first message, wherein the plurality of node-to-cluster assignments is derived from messages exchanged between a second plurality of nodes of the blockchain network and the second plurality of nodes of the blockchain network comprise the originating node and the destination node.

2. The method of claim 1, wherein the set of miners of the first cluster maintains a cluster-specific blockchain storing messages sent between nodes assigned to the first cluster.

3. The method of claim 2, wherein, when both the originating node and the destination node of the first message are assigned to the first cluster, the block computed for the first message is added to the cluster-specific blockchain.

4. The method of claim 1, wherein:

the blockchain network comprises a plurality of clusters, which includes the first cluster;

each of the plurality of clusters comprises a set of miners of the blockchain network; and the sets of miners of the plurality of clusters maintain a global blockchain storing messages sent between nodes assigned to different clusters among the plurality of clusters.

5. The method of claim 4, wherein, when one of the originating node and the destination node of the first message is assigned to the first cluster and the other one of the originating node and the destination node of the first message is assigned to another cluster among the plurality of clusters, the block computed for the first message is added to the global blockchain.

6. The method of claim 1, wherein the method further comprises:

broadcasting a validation result of the first message within the first cluster when both the originating node and the destination node of the first message are assigned to the first cluster.

7. A miner for participating in a computation of a block for a message to be added to a blockchain in a blockchain network, the miner comprising:

processing circuitry; and a memory, said memory containing instructions executable by said processing circuitry, whereby said miner is operative to perform the method of claim 1.

8. A computer program product comprising a non-transitory computer readable medium storing a computer program comprising program code portions for performing the method of claim 1, when the program code is executed on one or more computing devices.

9. A method for controlling participation of a first miner in a computation of a block for a first message to be added to a blockchain in a blockchain network, the method being performed by a managing node of the blockchain network and comprising:

sending, to the first miner, information indicating a first assignment assigning the first miner to a first cluster comprising a set of miners, which includes the first miner, of the blockchain network, the first assignment configuring the first miner to check whether at least one of an originating node and a destination node of a first message received by the first miner is assigned to the first cluster;

deriving a plurality of node-to-cluster assignments assigning a first plurality of nodes of the blockchain network to the first cluster, wherein the plurality of node-to-cluster assignments is derived from messages exchanged between a second plurality of nodes of the blockchain network and the second plurality of nodes of the blockchain network comprise the originating node and the destination node; and after deriving the plurality of node-to-cluster assignments assigning the first plurality of nodes of the blockchain network to the first cluster, sending, to the first miner, information indicating the plurality of node-to-cluster assignments assigning the first plurality of nodes of the blockchain network to the first cluster, the plurality of node-to-cluster assignments enabling the first miner to check whether at least one of the originating node and the destination node of the received first message is assigned to the first cluster.

10. The method of claim 9, wherein the plurality of node-to-cluster assignments is derived from previous messages stored in blocks of at least one blockchain of the blockchain network.

11. The method of claim 9, wherein the plurality of node-to-cluster assignments is determined based on interaction probabilities among the second plurality of nodes of the blockchain network and/or based on interaction probabilities among the first plurality of nodes and the second plurality of nodes of the blockchain network.

12. The method of claim 11, wherein:

the blockchain network comprises a plurality of clusters, which includes the first cluster;

each of the plurality of clusters comprises a set of miners of the blockchain network; and the plurality of node-to-cluster assignments is determined based on the interaction probabilities so that an expected number of messages sent between nodes assigned to different clusters among the plurality of clusters is reduced.

13. The method of claim 9, wherein the messages exchanged between the second plurality of nodes are not stored in a blockchain of the blockchain network at the time of deriving the plurality of node-to-cluster assignments.

14. The method of claim 9, wherein:

the blockchain network comprises a plurality of clusters, which includes the first cluster, each comprising a set of miners of the blockchain network; and the first assignment is one of the plurality of node-to-cluster assignments determined by the managing node and indicating assignments of miners of the blockchain network to the plurality of clusters.

15. The method of claim 14, wherein the plurality of node-to-cluster assignments are determined so that computational complexity for computing blocks by the miners of the blockchain network is adjusted to a set distribution among the plurality of clusters.

16. The method of claim 9, wherein the first assignment includes a configuration for the first miner to adjust a degree of difficulty to be applied in computing the block for the first message by the first miner.

17. The method of claim 9, wherein at least one of sending the information indicating the first assignment to the first miner and sending the information indicating the plurality of node-to-cluster assignments to the first miner is performed repeatedly with different assignments to dynamically adapt to varying conditions in the blockchain network.

18. A managing node for controlling participation of a miner in a computation of a block for a message to be added to a blockchain in a blockchain network, the managing node comprising:

processing circuitry; and a memory, said memory containing instructions executable by said processing circuitry, whereby said managing node is operative to perform the method of claim 9.

19. A computer program product comprising a non-transitory computer readable medium storing a computer program comprising program code portions for performing the method of claim 9, when the program code is executed on one or more computing devices.

* * * * *